(12) United States Patent
Opolka

(10) Patent No.: US 7,850,332 B2
(45) Date of Patent: Dec. 14, 2010

(54) BATTERY CARTRIDGE FOR FLASHLIGHT

(75) Inventor: Rainer Opolka, Solingen (DE)

(73) Assignee: Zweibruder Optoelectronics GmbH, Solingen (DE)

(*) Notice: Subject to any disclaimer, the term of this patent is extended or adjusted under 35 U.S.C. 154(b) by 17 days.

(21) Appl. No.: 12/168,296

(22) Filed: Jul. 7, 2008

(65) Prior Publication Data

US 2009/0016050 A1    Jan. 15, 2009

(30) Foreign Application Priority Data

Jul. 9, 2007    (DE) .................... 10 2007 032 003.7

(51) Int. Cl.
*F21L 4/00* (2006.01)

(52) U.S. Cl. ..................................... 362/206; 362/202

(58) Field of Classification Search ................. 362/202, 362/205, 206
See application file for complete search history.

(56) References Cited

U.S. PATENT DOCUMENTS

| | | | | |
|---|---|---|---|---|
| 6,086,217 A * | 7/2000 | Jau | ............................. | 362/119 |
| 6,199,998 B1 * | 3/2001 | Hsiao | ......................... | 362/119 |
| 6,536,912 B2 * | 3/2003 | Parker | ......................... | 362/206 |
| 6,880,951 B2 | 4/2005 | Yoon | ........................... | 362/206 |
| 7,186,002 B2 * | 3/2007 | Matthews et al. | ........... | 362/205 |
| 7,281,815 B1 * | 10/2007 | Gustafson et al. | .......... | 362/206 |
| 7,360,920 B2 * | 4/2008 | Dalton et al. | .............. | 362/187 |
| 7,635,197 B2 * | 12/2009 | Man | ............................ | 362/202 |
| 2004/0212991 A1 * | 10/2004 | Galli | ........................ | 362/157 |

* cited by examiner

*Primary Examiner*—Stephen F Husar
*Assistant Examiner*—Peggy A. Neils
(74) *Attorney, Agent, or Firm*—Andrew Wilford

(57) ABSTRACT

A battery cartridge has a casing adapted to releasably hold at least one battery, externally accessible contacts on the casing, and internal circuitry in the casing between the contacts and poles of the battery. A switch is mounted in the casing and connected to the circuitry between one of the poles and the respective contacts for controlling current flow therebetween.

11 Claims, 5 Drawing Sheets

BATTERY CARTRIDGE FOR FLASHLIGHT

FIELD OF THE INVENTION

The present invention relates to a battery cartridge. More particularly this invention concerns a battery cartridge for a flashlight.

BACKGROUND OF THE INVENTION

A typical flashlight is made of a number of individual parts, with the individual components having different service lives. Especially the internal components of flashlights, such as, for example, the contacts and the switch, must be regularly changed because they lose conductivity due to oxidation and contamination, for example, due to battery leakage. To improve exchangeability of the contacts, in particular the contact springs, U.S. Pat. No. 6,880,951, for example, provides for the batteries to be held in a battery cartridge. In the case of dirty contacts or worn-out contact springs, it is then possible to replace the wear-prone parts of the flashlight by simply exchanging the battery cartridge.

As a rule, high-quality flashlights have a very stable and thus expensive housing, to the end of which an end piece is often attached into which a pressure or push-button switch has been integrated. The flashlight disclosed in above-cited U.S. '951 also has such a push switch attached to its end.

The disadvantage of the prior-art systems is that, when replacing the pushbutton switch, it is necessary to replace part of the high-quality housing as well, which incurs significant costs. Moreover, contact replacement is laborious because they are mounted at locations inside the flashlight housing that are difficult to reach.

OBJECTS OF THE INVENTION

It is therefore an object of the present invention to provide an improved battery cartridge for flashlight.

Another object is the provision of such an improved battery cartridge for flashlight that overcomes the above-given disadvantages, in particular that allows the push switch to be replaced independently of the end cap, whereby the costs arising from such replacement are considerably reduced.

SUMMARY OF THE INVENTION

A battery cartridge has according to the invention a casing adapted to releasably hold at least one battery, externally accessible contacts on the casing, and internal circuitry in the casing between the contacts and poles of the battery. A switch is mounted in the casing and connected to the circuitry between one of the poles and the respective contacts for controlling current flow therebetween.

One embodiment of the battery cartridge provides for the casing of the battery cartridge to be able to accommodate at least one battery. Various embodiments have been provided for the battery cartridge. Thus, the number of batteries that may be used is optional. Preferably, one to six batteries may be accommodated in the battery cartridge. The type of electrical switch may also be selected when constructing the battery cartridge. The batteries may be connected inside the battery cartridge in series or parallel. However, all embodiments have in common that the battery cartridges have a push-button or push switch that is activated by a push button built into part of the housing of the flashlight. Preferably, the pressure or push-button switch is provided on the end of the battery cartridge and the push button required for its activation is integrated into an end cap of the flashlight housing. The battery contacts, which are also integrated into the cartridge, may simply be replaced by exchanging the battery cartridge, which guarantees a constant quality of the flashlight. Replacement of the push switch in particular is now less cost intensive because the complete end piece made of high-quality material no longer need be replaced, only the actual electrically contacting part that is subject to erosion and wear.

The battery cartridge preferably has a circuitry that is organized such that a negative pole and a positive pole are at a front end of the battery casing. A small light bulb or, preferably, an LED may then be connected to the two poles. In order to guarantee a secure fit of all of the components, provision is made for the battery cartridge to be connected in a detachable fashion to the end cap and for the end cap to be connected to the rest of the housing by a screw fitting. In its assembled state, the battery cartridge is inserted into the housing.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
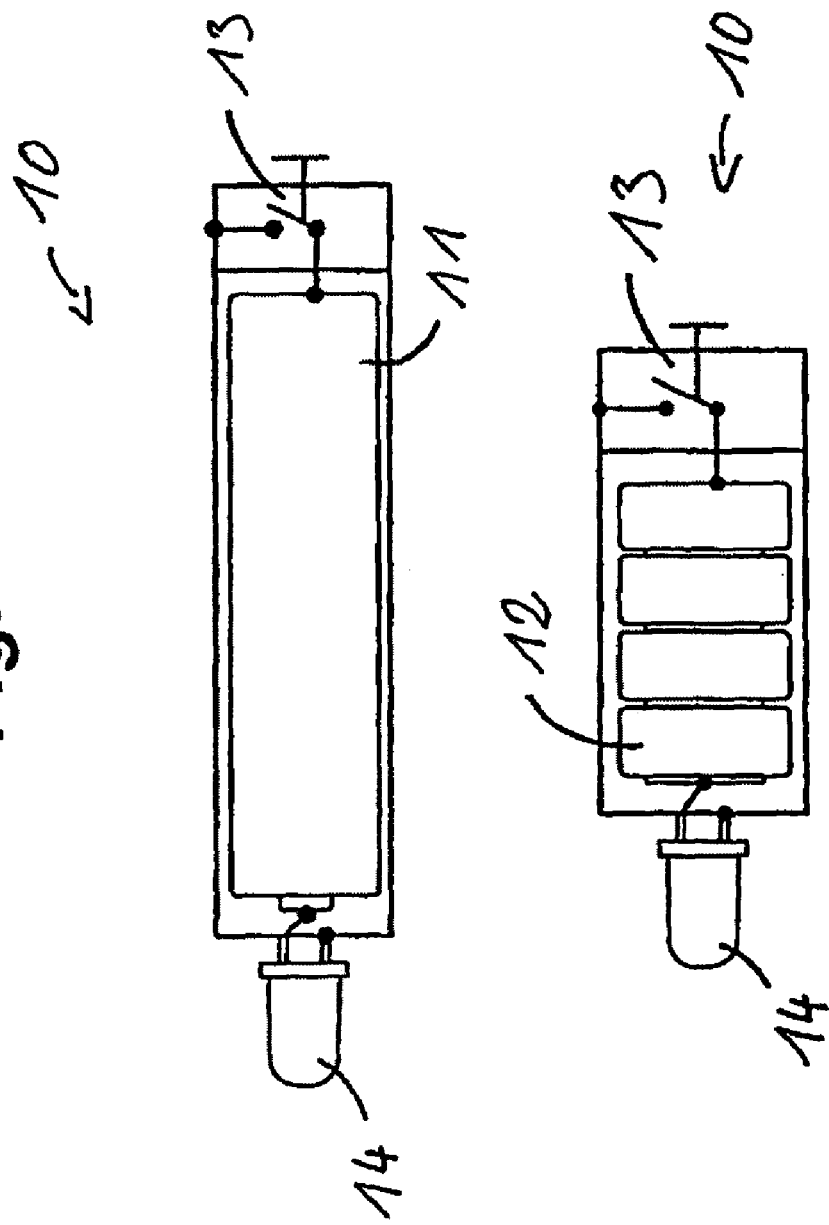
FIG. 1a is a circuit diagram of a battery cartridge according to the invention with one battery.
FIG. 1b is a circuit diagram of the battery cartridge with four batteries.

As seen in FIG. 1a a battery cartridge 10 can hold a single battery 11, for instance a AA or AAA single-cell model and in FIG. 1b the cartridge holds four button cells 12. On the rear end in both illustrated embodiments, a push switch 13 may be seen that is integrated into the battery cartridge 10. An LED or a light bulb 14 is shown on the opposite front end in both illustrated embodiments.

Figure 2:
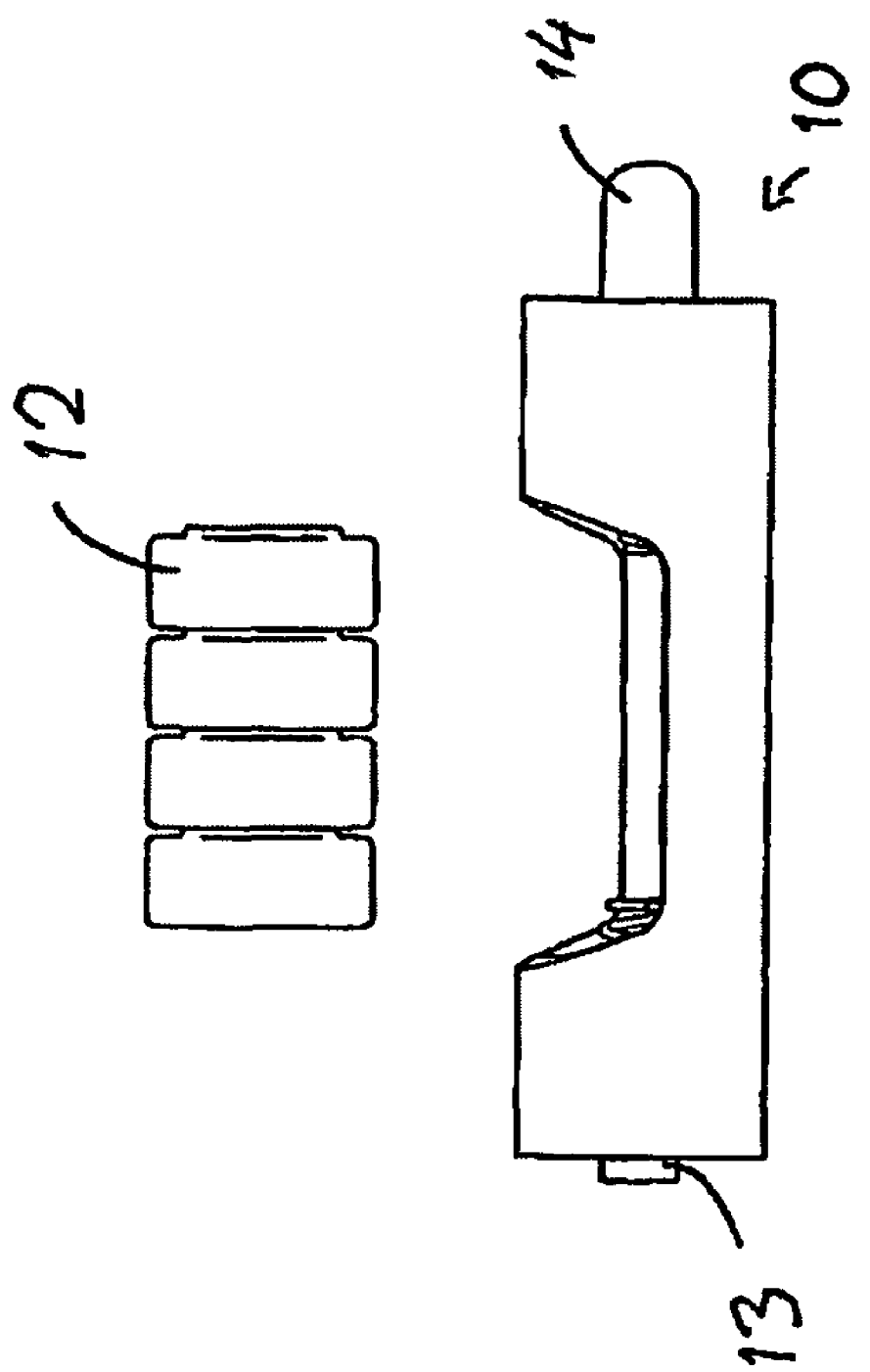
FIG. 2 shows a battery cartridge for four button cells.
Figure 3:
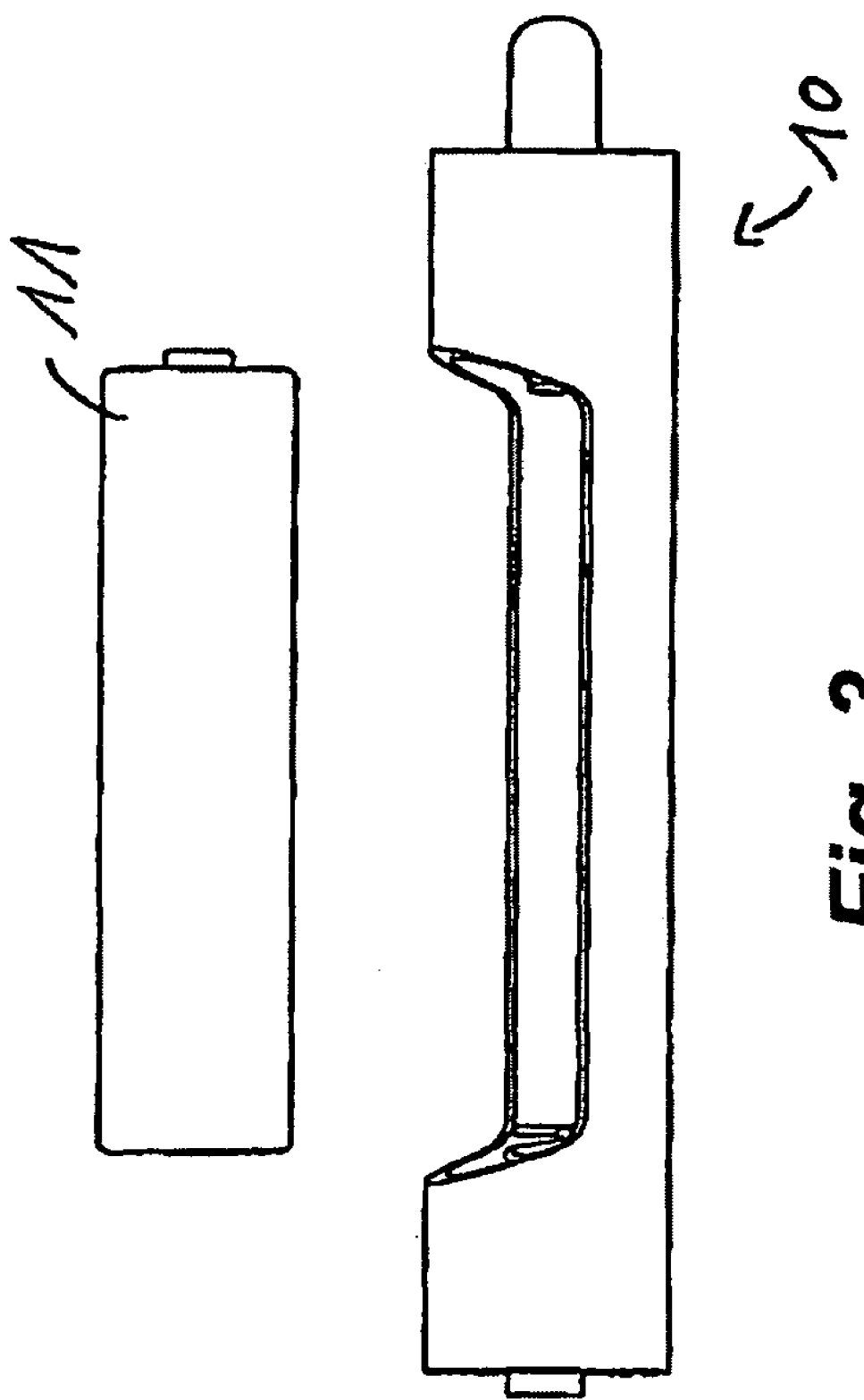
FIG. 3 shows a battery cartridge for one dry-cell-type battery.

FIG. 2 shows a perspective view of a battery cartridge 10 according to the invention having an integrated push switch 13 and an LED or a light bulb 14. The illustrated embodiment shown is able to accommodate four button cells 12. FIG. 3 shows an illustrated embodiment similar to that of FIG. 2; however, this battery cartridge 10 is intended for accommodating one dry-cell-type battery 11.

Figure 4:
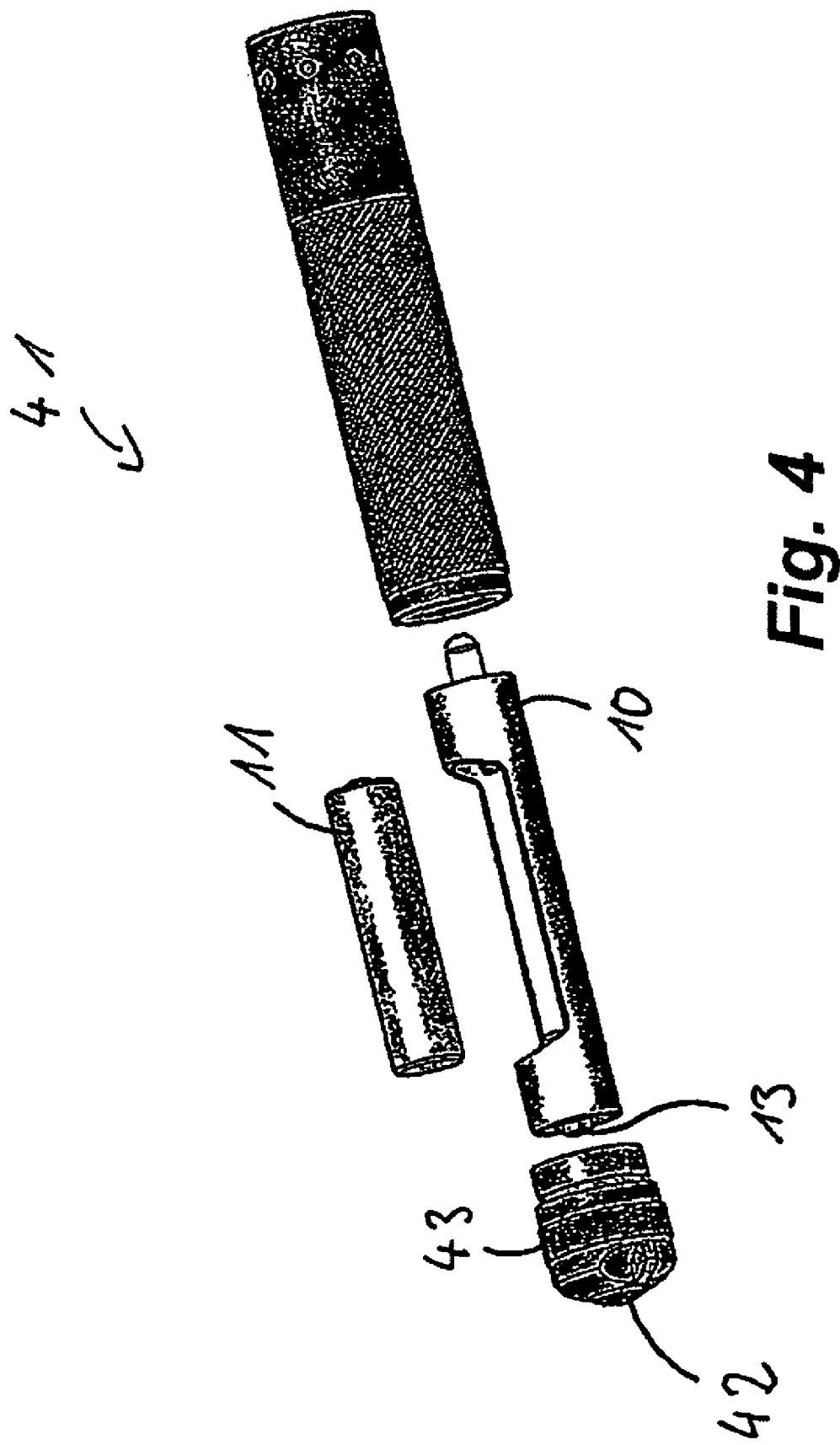
FIG. 4 is an exploded view of a flashlight with a battery cartridge for a dry-cell-type battery.
Figure 5:
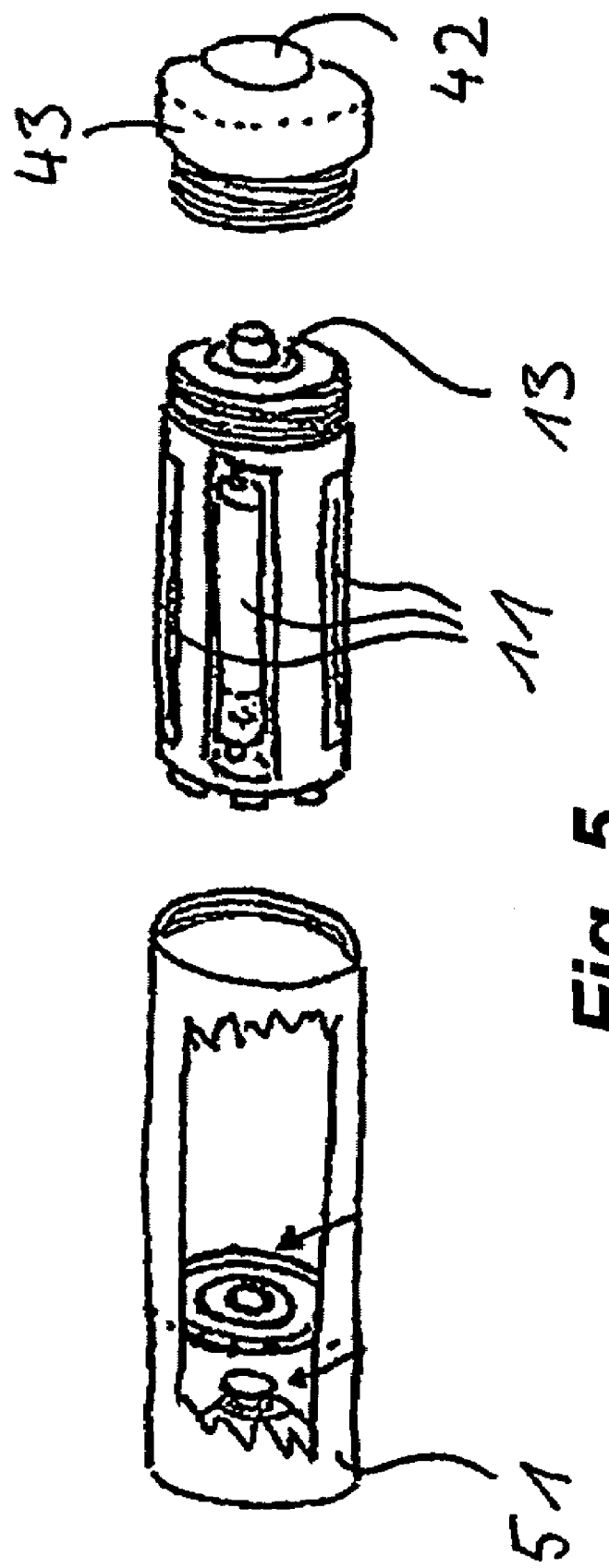
FIG. 5 shows in exploded view another embodiment of the battery cartridge in an exploded view with an end cap that may be screwed on and off and the associated flashlight housing.

FIG. 4 shows an exploded view of a flashlight 41 that is suitable for holding the battery cartridge 10 according to the invention. The push switch 13 of the battery cartridge 10 may be activated in its installed state by a push button 42 built into an end cap 43 of the flashlight 41. The illustrated embodiment of the battery cartridge 10 shown provides for the flashlight 41 to be operated using a dry-cell-type battery 11. FIG. 5 shows an exploded view of a battery cartridge 10, an end piece 43, and a flashlight housing 51. The battery cartridge 10 has an integrated push switch 13. On its end piece 43, an integrated push button 42 is shown. The illustrated embodiment shown provides for multiple dry-cell-type batteries 11 to be mounted parallel to one another in a battery cartridge 10 that may be inserted into the flashlight housing 51. This results in a compact construction, in particular for large flashlights.

I claim:

1. In combination,
a battery cartridge comprising:
 a casing adapted to releasably hold at least one battery,
 externally accessible contacts on the casing,
 internal circuitry in the casing between the contacts and poles of the battery, and
 a switch mounted in the casing and connected to the circuitry between one of the poles and the respective contacts for controlling current flow therebetween;
a hollow flashlight housing adapted to hold the cartridge;
an end cap separate from the cartridge and removably fittable to an end of the flashlight housing to hold the cartridge in the flashlight housing; and
a button built into the end cap or into the flashlight housing and engageable with the switch of the cartridge for activating the switch of the cartridge inside the housing from outside the housing.

2. The battery cartridge defined in claim 1 wherein the switch is a pressure or push-button switch.

3. The battery cartridge defined in claim 1 wherein the casing is elongated and has front and rear ends, the switch being mounted on the rear end.

4. The battery cartridge defined in claim 3 wherein the contacts are on the front end, the cartridge further comprising
 a light source mounted permanently on the front end and connected to the contacts.

5. The battery cartridge defined in claim 4 wherein the light source is a light-emitting diode.

6. The combination defined in claim 1 wherein the button is depressable for engagement with the switch when the cartridge is in the housing.

7. The combination defined in claim 1 wherein the end cap and housing have interengaging threads for securing the end cap on the housing.

8. The combination defined in claim 1 wherein there are a plurality of the batteries held in the cartridge.

9. The combination defined in claim 1 wherein the housing and casing are both generally cylindrical.

10. The combination defined in claim 1 wherein the casing is laterally open for removal of the battery.

11. The combination defined in claim 1 wherein the switch is a pushbutton switch and button is a pushbutton on the end cap engageable with the pushbutton switch.

* * * * *